United States Patent

[11] 3,576,949

[72] Inventors Frans Corneel Leo DeWit
Mortsel, Belgium;
Hans Helmut Adelaar, Kapellenbos,
Belgium
[21] Appl. No. 698,796
[22] Filed Jan. 18, 1968
[45] Patented May 4, 1971
[73] Assignee International Standard Electric Corporation
New York, N.Y.
[32] Priority Jan. 23, 1967
[33] Netherlands
[31] 6,701,051

[54] MULTISTAGE SWITCHING NETWORK EMPLOYING CASCADED THREE-TERMINAL CROSSPOINTS
7 Claims, 5 Drawing Figs.

[52] U.S. Cl. .......... 179/18
[51] Int. Cl. .......... H04q 3/48
[50] Field of Search .......... 179/18.7 (Y)

[56] References Cited
UNITED STATES PATENTS
3,435,417 3/1969 Haselton, Jr. .......... 179/18(.7Y)
3,395,253 7/1968 Warman .......... 179/18(.7Y)
3,294,920 12/1966 Kroes et al. .......... 179/18(.7Y)

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel and Delbert P. Warner

ABSTRACT: A multistage relay crosspoint network is disclosed in which a connection is held operated through the windings of the relays, each in series with its make contact. In a four-stage connection the hold contacts of the 1st and 2nd as well as those of the 3rd and 4th stages are serially connected and such hold connections replace similar parallel ones involving marking contacts. The invention substantially reduces the number of marking relays needed to establish connections by having the windings of the 1st and 2nd as well as those of the 3rd and 4th stages on the same side and by selecting, through access relay contacts, the desired crosspoints in the 1st and 3rd stages while marking rectifiers are used in the 2nd and 4th to enable bundles of marking wires to be selected in these stages in order to operate the desired crosspoints in these stages also.

Figure 1:
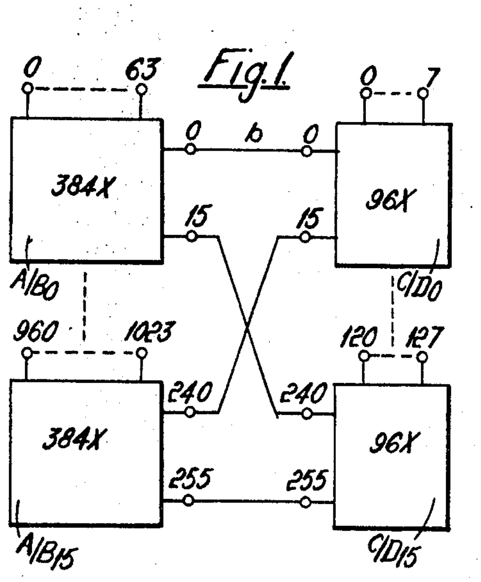

Inventor
F. De Wit - H. Adelaar 3-54

By
Attorney

Inventor

F. De Wit - H. Adelaar

By [signature] Attorney

MULTISTAGE SWITCHING NETWORK EMPLOYING CASCADED THREE-TERMINAL CROSSPOINTS

MULTISTAGE SWITCHING NETWORK

This invention relates to a multistage switching network in which a connection may be established by simultaneously operating a plurality of interconnected cascaded 3-terminal crosspoints, each with a marking path between a first pair of terminals and a holding path between a second pair of terminals, over a marking connection via serially connected marking paths, the connection remaining held via serially connected holding paths after the release of said marking connection.

Such a multistage switching network is known from the British Pat. No. 996,147 and it is particularly applicable to networks in which any terminal at one end of the network may be connected to any terminal at the other end via a unique switching path through the successive switching stages. In the arrangement described, two successive stages may be associated back to back so that the crosspoint relay windings in one stage may be serially connected with those of the other stage through make contacts of marking relays interposed between the two windings. By providing a marking relay per external inlet to either stage, it becomes possible to selectively operate two crosspoints in series, one in each stage, as a result of the operation of two marking relays, one characterizing an inlet of one stage and the other an inlet of the other stage, a suitable potential source being provided to interconnect the ends of the windings in the two stages which are not coupled via the marking contacts. As soon as the two crosspoint relays operate in series, make contacts pertaining to these relays are closed and they may duplicate the interconnection between the two crosspoint relay windings so that the marker relays may be released while the connection is being held. Such tandem switching stages may in turn be cascaded so that a four-stage switching network may be realized, able to perform connections between any pair of outside terminals, one at each end of the network, via a unique path therethrough. The first and the second stages will be interconnected in the manner explained as well as the third and the fourth stages, and direct interconnections will be provided between the crosspoint relay windings of the second and third stages.

Such an arrangement offers the advantage that once the external inlets have been marked for each pair of cascaded stages, application of a potential source between the two ends of the overall network to be interconnected will lead to the simultaneous operation of all crosspoint relays, e.g. four, in series.

In some networks however the number of external inlets may be substantial. For instance, a four-stage switching network may be used for the selective interconnection of 1024 telephone lines with 128 junctors, the number of links between the second and the third stage being equal to 256. Accordingly, the number of marking relays to interconnect these 1024 lines, 256 internal links and 128 junctors will be equal to 1024+256+128=1408.

A general object of the invention is to substantially reduce the number of marker relays in an arrangement of the type described.

In accordance with a characteristic of the invention, in a multistage switching network of the type initially defined, said marking connections involve the marking of a crosspoint in odd-ranked stages and the marking of a group of crosspoints in the even-ranked stages, the crosspoints in said even-ranked stages accessible from said single marked crosspoint in the preceding odd-ranked stage being in distinct groups.

In accordance with another characteristic of the invention, said multistage switching network includes an even number of stages, said crosspoints at stages within holding paths are asymmetrical and oppositely directed with regard to those in adjacent stages, and in a terminal stage of said network, the terminals of its crosspoints which are common to the marking and to the holding path are connected to like terminals in the next stage.

In accordance with a further characteristic of the invention, the crosspoints in the stages wherein a single crosspoint is marked to establish a connection include a marking relay contact in the marking path.

In accordance with yet a further feature of the invention, the crosspoints in the stages wherein a bundle of crosspoints is marked to establish a connection include an asymmetrically conducting impedance in the marking path.

Thus, whereas in the four-stage switching network of the British Pat. No. 996,147, the serial marking path through the four stages extends through the winding of the crosspoint relay in the first stage, its associated marking contact, the associated marking contact of the crosspoint relay in the second stage, the winding of that crosspoint relay, the crosspoint relay in the third stage, followed by its associated marker contact, the associated marker contact of the crosspoint relay in the fourth stage and finally the winding of that relay, in the present arrangement, the order of the winding and the associated marking contact is reversed in each stage. This reversal will of course also be true with respect to the crosspoint relay make contacts serving to hold the connection and which are arranged in parallel link connections with regard to contacts of the marker relays. Moreover, in the arrangement now disclosed marking relay contacts are only individually associated to the crosspoint relays in the odd-ranked stages whereas in the even-ranked stages, decoupling diodes are used instead.

In a telephone switching network of the size disclosed above, the new arrangement limits the number of marker relays in the two odd-ranked stages to 32+128=160 and in addition, 4+4+4+8=20 so called access relays are needed, no marker relays being necessary for the even-ranked stages where the marker relay contacts individually associated to the crosspoints are replaced by marking diodes.

Figure 3:
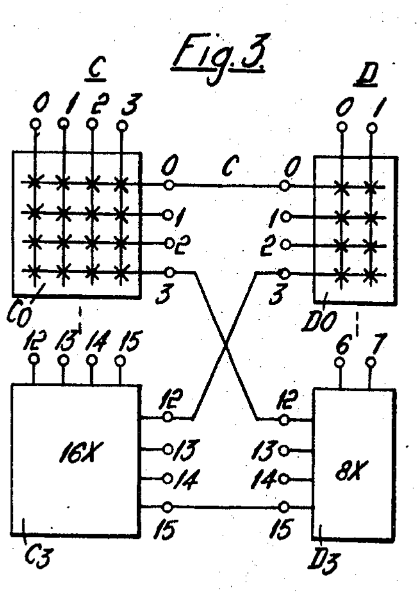
Figure 2:
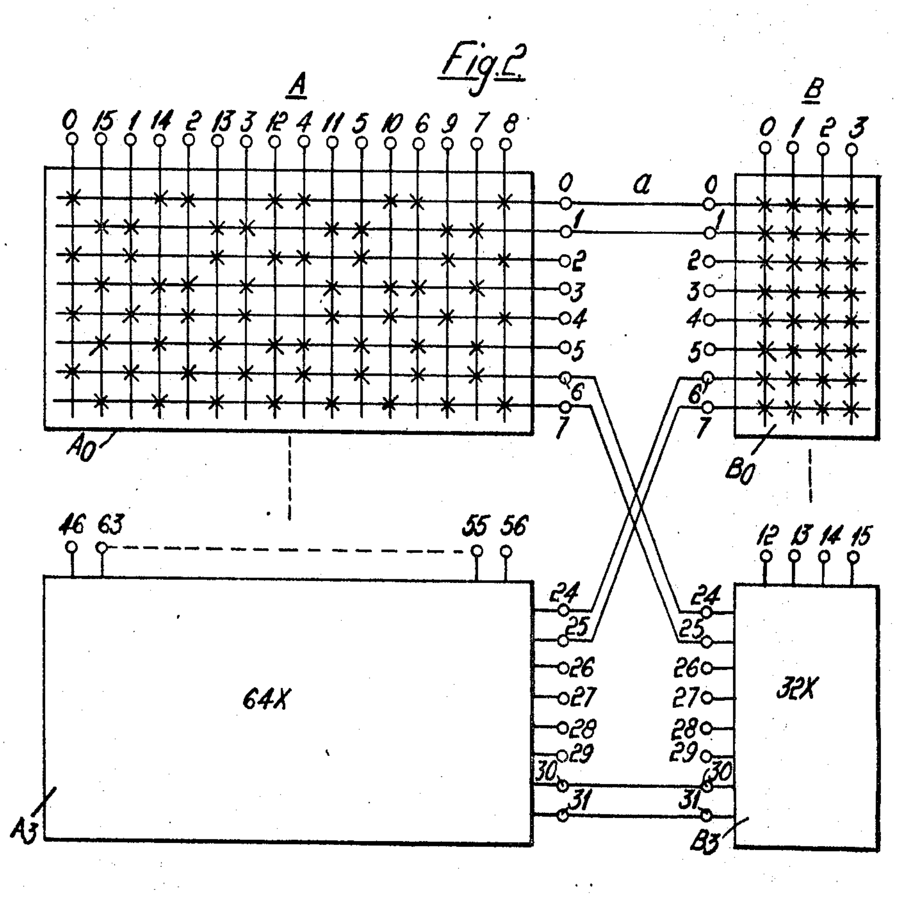
Figure 4:
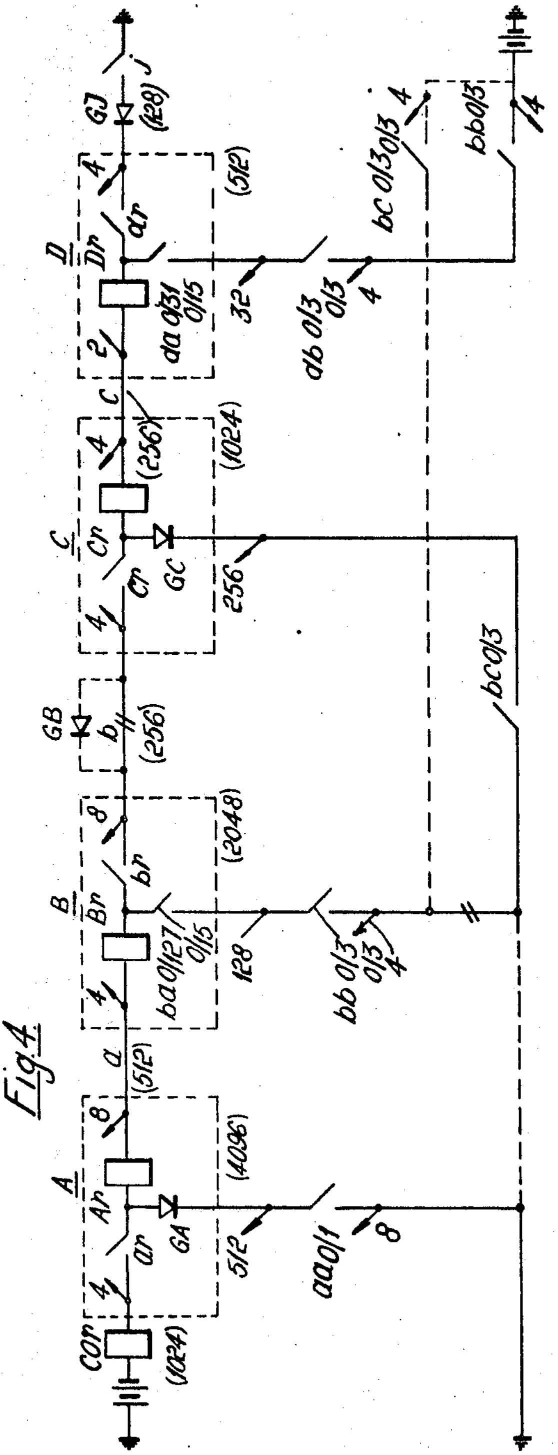
Figure 5:
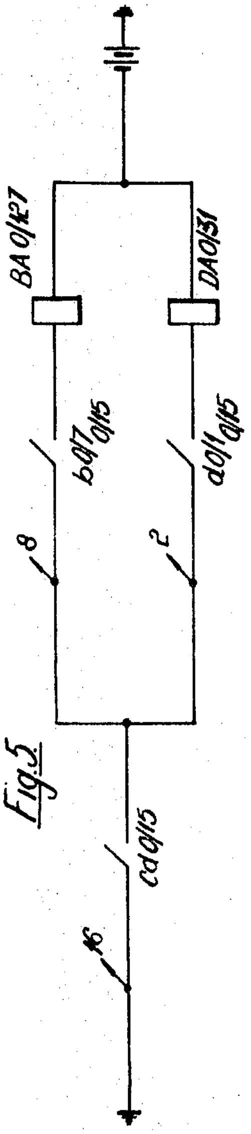

The above and other objects and characteristics of the invention as well as the best manner of attaining them and the invention itself will be better understood from the following detailed description of an embodiment thereof to be read in conjunction with the accompanying drawings which represent:

FIG. 1, a switching network to which the invention may be applied;

FIG. 2, the manner in which the first two stages of the network of FIG. 1 are realized and interconnected;

FIG. 3, the manner in which the last two stages of the network of FIG. 1 are realized and interconnected;

FIG. 4, the way in which a connection is marked through the four cascaded stages of the network of FIG. 1; and FIG. 5, an operating circuit for the marker relays whose contacts are used in the network of FIG. 1 in the manner represented in FIG. 4.

Referring to FIG. 1, the latter represents in block diagram form a four-stage switching network enabling connection to be established between any one out of 1024 external inlets and any one out of 128 external outlets, there being a unique path for every possible interconnection. Each of the four switching stages A, B, C and D comprises 64 crosspoint matrices which with one exception, the A stage, are simple rectangular coordinate arrangements in which a crosspoint is provided between every inlet and every outlet. The matrices of the A and B switching stages are grouped in A/B planes while those of C and D switching stages are grouped in C/D planes. These planes are shown in FIG. 1 and it is seen that the 16 A/B planes have each 64 inlets numbered from 0 to 63 for $A/B_0$ while each of the 16 C/D planes such as $C/D_0$ has eight outlets numbered from 0 to 7. In order to afford interconnections between all inlets and all outlets, and this on a unique path basis for each connection a so called b-link is provided between every A/B plane and every C/D plane so that altogether there are 16×16=256 b-links. Thus, the A/B planes have 16 outlets while the C/D planes have a like number of inlets, these being numbered from 0 to 15 for the first planes $A/B_0$ and $C/D_0$ which are together with the last planes $A/B_{15}$ and $C/D_{15}$ are the only ones shown on FIG. 1.

The A/B planes serve essentially to concentrate the traffic from 64 telephone lines to 16 internal links and for this reason will be called concentration planes. On the other hand the C/D planes serve the purpose of mixing the traffic from the 16 concentrating planes and will accordingly be called mixing planes.

FIG. 2 details one of the concentration planes such as $A/B_0$ shown in FIG. 1. It is shown to comprise four matrices $A_{0/3}$ and four matrices $B_{0/3}$. The first have 16 inlets and eight outlets while the second have eight inlets and four outlets. Only the first and the last matrices out of each series of four are shown in FIG. 2 with $A_0$ and $B_0$ represented in detail to show the crosspoint arrangements. As already mentioned, $B_0$ is a simple coordinate arrangement with a crosspoint, indicated by a cross, connected between every inlet and every outlet so that each of the B matrices has 4×8=32 crosspoints. The A matrices such as $A_0$ constitute however a different arrangement since despite there being 16 inlets and eight outlets, there is only a total of 64 crosspoints per A matrix. This is due to the fact that the eight outlets of the A matrices such as $A_0$ are arranged in pairs such as 0–1, 2–3, 4–5 and 6–7. Each of the 16 inlets such as O is connected to one outlet in each of the four pairs. It is clear that this affords $2^4$=16 different possibilities and all these are shown to be exploited for the 16 inlets of $A_0$. The first inlet O is connected to the upper outlet in each pair, i.e. the even-ranked numbers 0–2–4–6, while the immediately following inlet numbered 15 is shown to be connected to the complementary outlets i.e. the odd-ranked 1–3–57. It will be recognized that the inlets are arranged so that inlet O corresponding to the binary code 0000 is followed by inlet 15 corresponding the complementary binary code 1111, the next inlet 1 corresponding to the binary code 0001 and being followed by inlet 14 corresponding to the complementary binary code 1110, etc. This pictorial grouping of complementary inlets will be useful in relation to explanations regarding the marking operations which will follow in a later part of this description.

Each pair of outlets from an A matrix such as 0–1 for $A_0$ is coupled via corresponding *a*-links to a pair of inlets of a distinct B matrix so that full accessibility between an A inlet and a B outlet in an A/B concentration plane is secured by means of 32 *a*-links.

FIG. 3 represents mixing plane such as $C/D_0$ which includes four matrices $C_{0/3}$ and four matrices $D_{0/3}$, the first having four inlets and four outlets while the second have four inlets and two outlets which are numbered in the same way as for the matrices of FIGS. 1 and 2. Whereas the latter were interconnected by pairs of *a*-links so that every one of the four A matrices could be connected to every one of the four B matrices, the *c*-links fulfill the purpose between the stages C and D. Altogether there are thus 16 *c*-links per mixing plane.

FIG. 4 represents the way in which a connection may be marked through the four stages in cascade in order to secure a one shot operation of all four cascaded crosspoints while at the same time using a minimum number of marker relays. The connections are to be extended from the line circuit side of a telephone line and more particularly from negative battery through the winding of a cutoff relay *Cor*, to junctor circuits and more particularly to a ground therein which is applied through a make contact *j* in series with a decoupling diode GJ. As indicated by numbers within brackets next to the various elements, there are altogether 1024 line circuits and 128 junctor circuits. A connection thus established may involve the control wire of a telephone exchange connection which will thus be used as holding wire to maintain the crosspoint relays operated and thereby keep the speech contacts (not shown) closed.

The crosspoint in the A stage is shown to include the crosspoint relay winding *Ar*, its make contact *Ar* and a marking diode GA, all three elements being associated in star formation. Such a crosspoint arrangement has been disclosed in the British Pat. No. 863,388 (H. STOBBE ET AL. 17–7–7). In correspondence with the matrix $A_0$ shown in FIG. 2, the multiplying arrow marked with 4 after the cutoff relay *Cor* indicates that the latter is multiplied to four crosspoints. On the other side thereof, the multiplying arrow numbered 8 indicates that each of the following *a*links has access to eight crosspoints in the A stage. Similar multiplying arrows in FIG. 4 can be readily understood by referring to the earlier FIGS. and particularly FIGS. 2 and 3.

The winding of crosspoint relay *Ar* is connectable to winding of crosspoint relay B*r* in the following B stage. The D crosspoints are somewhat similar to the A crosspoints except that the marking diodes such as GA are replaced by marking relay contacts indicated by $ba\mathbf{0/127}_{0/15}$ pertaining to the 128 relays BA0/127 each having 16 contacts and whose operating circuits are represented in FIG. 5.

Via the *b*links, the B crosspoints are connected to those of the next stage, i.e. C, which are identical to those of the A stage. This time however, the crosspoint make contacts such as *br* and *cr* face one another instead of the crosspoint relay windings between the A and B stages.

Finally, the C crosspoints are connected to those of the D stages through the *c*-links, again with the crosspoint relay windings such as C*r* and D*r* connectable to one another. The D crosspoints are of the same type as those of the B stage and the marking relay make contacts $da\mathbf{0/31}_{0/15}$ are those of the 32 marking relays DA0/31 each with 16 contacts and whose operating circuits are represented in FIG. 5.

The general principle of operation of the relays shown in FIG. 4 is based on the marking of a particular crosspoint both in the D and in the B stages, the decoupling diodes used in the A and C stages enabling bundles of crosspoints to be associated together for the marking connections. The latter extends in series from positive battery through the four stages D, C, B and A in that order down to ground at the left-hand side of the FIG.

A particular set of 32 A crosspoints out of 16 such sets is reached at the starting end by means of the contacts of access relays. Similar contacts are used to interconnect a particular one out of four groups of 256 C crosspoints with a particular one out of 16 groups of 128 B crosspoints. Finally, the A crosspoints are marked in groups of 512, there being eight such groups.

Since there is only one path between each pair of line and junctor terminals, once the identity of the line among the 1024 is known, as well as the identity of the junctor among the 128, the desired connection between the two selected end terminals can be marked.

One particular crosspoint in the D stage out of the 512 crosspoints of that stage will be marked by positive battery, e.g. the crosspoint between inlet 0 and outlet 0 in FIG. 3. Positive battery potential will be applied to the desired crosspoint relay winding D*r* through the make contacts of three relays, all in series. First, there are provided four relays BB0/3 which are access relays not represented but each of which has five contacts. The first contacts of each are indicated by *bb*0/3 and closure of a selected make contact among the four will occur upon the operation of the corresponding access relay which defines the inlet of the D matrix (FIG. 3), there being four inlets for all such matrices.

A second set of four access relays DB0/3 (not shown) is provided to further select the D crosspoint. These relays have each four make contacts $db\mathbf{0/3}_{0/3}$ which are included in the second stage of the contact pyramid starting from positive battery and going first through the make contacts *bb*0/3. Operation of one D*r* relay will permit the selection of the desired D matrix in a mixing plane (FIG. 3).

The remaining selection for the D crosspoint therefore consists in choosing one or the other outlet of a D matrix as well as the particular mixing plane out of the 16. The selection of the mixing plane C/D occurs with the help of CD0/15 relays each having a make contact. These relays are also not shown, but their make contacts *cd*0/15 appear in FIG. 5. Therein it is shown that one end of each of these 16 contacts is grounded while the other end of the contact leads to two make contacts indicated by $d0/1_{0/15}$. These belong to two further relays D0/1 each with 16 contacts and which are also not represented. These two relays D0 and D1 identify the outlet of the D matrix corresponding to the desired crosspoint.

In this way, as indicated in FIG. 5, the operation of one of the 16 CD0/15 relays and of one of the two D 0/1 relays will result in the application of ground to one out of 32 conductors only, all these 32 conductors leading to negative battery through the windings of 32 corresponding marking relays DA0/31 each with 16 contacts and associated to the D crosspoints.

In the manner explained, the positive marking potential may thus reach one particular *c*-link corresponding to the marked crosspoint in D stage through the winding of a relay D*r*. From FIGS. 3 and 4 it is seen that this potential will be applied through the windings of C*r* relays to four distinct marking diodes such as GC towards the four concentration planes (A/B) numbered from 0 to 3. Another set of four access relays enable the channelling of this positive marking potential to only the desired concentration plane. These access relays have not been shown but their marking contacts have been represented in FIG. 4 by *bc*0/3. The first marking contact *bc* 0 corresponds to the four concentration planes 0–4–8–12, the second make contact *bc* 1 to the concentration planes 1–5–9–13, etc. Thus, the diodes GC from all 16 mixing planes are multiplied in four groups corresponding to the four columns shown for matrix $C_0$ in FIG. 3.

In this manner, each bundle of 256 marking diodes may be led separately to a further set of access relay contacts $bb0/3_{0/3}$ via a separate make contact out of the set of four *bc*0/3, only one of the four being operated at a time. It has already been explained in relation to the make contact *bb*0/3 that the four corresponding access relays enable to identify the inlet of the D matrix. At the same time, from FIG. 3, it is clear that this is also an identification of a group of four concentration planes, i.e. those numbered from 0 to 3, or from 4 to 7, etc. Thus, the fact that a particular BB relay is operated means that the positive marking potential having passed through make contact *bc*0 may also pass through make contact $bb0_0$, this contact pyramid thus enabling the marking potential to reach the desired concentration plane where it will now be channelled to the desired B crosspoint out of 128 present in each concentration plane.

The closure of a particular make contact out of the series of 16 indicated by *cd*0/15 in FIG. 5 enabled the selection of the desired mixing plane (C/D). Since the outlets of the B matrices (FIG. 2) precisely identify the 16 mixing planes, this means that the *cd*0/15 contact also select a B matrix and its outlet inside a concentration plane. To select the desired B crosspoint, there remains only a selection out of 8 corresponding to the desired B inlet or *a*-link. As represented in FIG. 5, this is achieved by a further set of eight relays (not shown) whose make contacts are identified by $b0/7_{0/15}$. Each of these eight relays has 16 contacts, being involved in a two-stage 16×8 contact pyramid represented in FIG. 5. As a result of the operation of a particular make contact *cd*0/15 and a particular make contact $b0/7_{0/15}$, it is seen from FIG. 5 that a particular relay DA0/127 will be operated out of the 128 marker relays for the B stage since its winding terminates the contact pyramid at one end and is connected to negative battery at the other.

This means that only one of the 16 contacts of the operated BA relay will receive the positive marking potential from the C stage and will pass it to the desired B crosspoint, i.e. that located at the intersection of inlet O and outlet O and corresponding to make contact $ba0_0$ if connection to the 0 inlet in matrix $A_0$ is ultimately desired. Thus, through the winding of one particular B*r* relay the marking potential will be applied to the windings of eight A*r* relays in the A stage and reached through a particular *a*-link.

FIG. 2 shows that each *a*-link has only access to eight out of the 16 inlets or lines in the A matrix and that conversely each of the latter has only access to four *a*-links, one in each pair of successive *a*-links. As they have been ranked in FIG. 2 however, two successive inlets or lines such as O and 15 have access to a complete set of eight *a*-links. A further set of eight access relays (not shown) each having a marking make contact as represented by $aa_{0/7}$ in FIG. 4 may be used to identify in common for all the A matrices of the network each set of two adjacent inlets or lines such as 0 and 15. In this manner, by operating only one of the 8 relays, only one of the 8 make contacts $aa_{0/7}$ will be closed, i.e. that to which are connected the cathodes of the diodes GA corresponding to the pair of inlets 0 and 15 in each A matrix. Accordingly the positive marking potential applied to the anodes of the eight diodes GA coupled to outlet 0 of matrix $A_0$ through the windings of the respective A*r* relays will only be able to pass current through one of the eight marking diodes, i.e. that corresponding to the desired 0 inlet in matrix $A_0$.

Since ground is shown to be connected through contacts $aa_{0/7}$ (FIG. 4) on the cathode side of the diodes GA, the marking connection is thus completed and in this manner only four particular crosspoint relays A*r*, B*r*, C*r*, and D*r* are able to operate in series simultaneously to establish the desired connection. This leads to their respective make contacts such as are for relay A*r* being closed and if at this instant the make contact *j* in the selected junctor circuit has been closed, a holding connection now extends through the winding of all four relays in the successive four stages, starting from ground trough make contact *j* and diode GJ to end at the cutoff relay C*or* connected to negative battery and which operates in series with the other relays. The decoupling diode GJ prevents current from the positive marking potential from being diverted to ground. From that moment onwards, all the marking and access relays may be released and since the starting potential at the right-hand side of the connection has now been lowered from positive battery to ground while the ground marking potential at the other end of the marking connection is also higher than the negative battery potential biasing the cutoff relay, renewed operations of the marker and access relays so as to mark a new connection cannot disturb the existing ones as the potentials at the anode of the diodes such as GA and GC involved in established connections are all negative whereas new marking connections can only apply positive potentials to their cathodes. On the other hand, in view of the selection of particular crosspoints in each of the B and D stages, a positive marking potential can no longer reach a crosspoint in the B or D stage involved in an established connection since this could only happen by marking a new crosspoint directly connected to a busy *a*- or *C*-link, which marking may of course not take place if double connections are to be avoided.

The marking scheme of FIG. 4 shows a direct association between the windings of the crosspoint relays in the A and B stages, as well as a like association between the like windings in the C and D stages, the two paths being serially combined through the contact pyramid involving $bb0/3_{0/3}$ and *bc*0/3. Instead of associating pairs of stages in series, it is also possible to associate them in parallel and this is represented also in FIG. 4 by the dotted line connections which should then be used while those full line connections crossed by two short lines should be suppressed. The marking of the D crosspoint is not affected by this change, but ground is now directly provided at one of the four make contacts *bc*0/3 in order that the desired C*r* relay should operate in series with the desired D*r* relay. On the other hand, to have direct access to the make contacts $bb0/3_{0/3}$ from the positive marking potential without passing through the C and D stages, sets of four contacts $bc0/3_{0/3}$ additional to the contacts $bc_{0/3}$ should be provided on the BC relays. In this way, the desired crosspoint in one B matrix may be directly reached from the positive marking potential and the two selected relays A*r* and B*r* operate in series but in parallel with the series operated relay G*r* and D*r*. The decoupling diodes such as GB now inserted in each of the 256 *b*-links are used to decouple the marking positive potential and ground when the contacts *br* and *cr* are closed. Make contacts *ar* and *dr* of course also operate at the same time to establish the connection in the manner previously described as well as to hold it in the same way.

With a reasonably large network, the essential part of the marking contacts is to be found in direct association with the B and D stages so that there is hardly any increase of equipment with regard to the known scheme, the marking contacts in the latter individually associated with the stages A and C now being replaced by individual marking diodes. On the other hand, the number of marking relays which is essentially constituted by the 128 BA and the 32 DA relays is very much reduced even when limiting the number of their make contacts to 16.

While the principles of the invention have been described above in connection with specific apparatus, it is to be clearly understood that this description is made only by way of example and not as a limitation on the scope of the invention.

We claim:

1. A multistage switching network in which a connection may be established by simultaneously operating a plurality of interconnected cascaded three-terminal crosspoints, each with a marking path between a first pair of terminals and a holding path between a second pair of terminals, over a marking connection via serially connected marking paths, the connection remaining held via serially connected holding paths after the release of said marking connection; in which said marking connections involve the marking of one of said crosspoints in an odd-ranked switching stage and the marking of a group of crosspoints in an even-ranked switching stage, the crosspoints in said even-ranked switching stage accessible from said single marked crosspoint in the preceding odd-ranked stage being arranged in distinct groups.

2. A multistage switching network as claimed in claim 1, which includes an even number of stages, wherein said crosspoints at stages within a holding path are asymmetrical and oppositely directed with regard to those in adjacent stages, and that in at least one stage of said network, the terminals of its crosspoints which are common to the marking and to the holding paths are connected to like terminals in the next stage.

3. A multistage switching network as claimed in claim 1, in which the crosspoints in the stages wherein a single crosspoint is marked to establish a connection include marking relay contacts in the marking path.

4. A multistage switching network as claimed in claim 1, in which the crosspoints in the stages wherein a group of crosspoints is marked to establish a connection include an asymmetrically conducting impedance in the marking path.

5. A multistage switching network as claimed in claim 4, in which said marking paths include selecting contacts connected to each crosspoint, a marking relay at each crosspoint, and within each stage wherein a group of crosspoints is marked, said asymmetrically conducting impedances are interposed between the selecting contact and the relay of said crosspoint.

6. A multistage switching network as claimed in claim 1, in which said stages are cascaded, with the holding connections held in series through the different stages while the marking connections through the different stages are established in parallel.

7. A multistage switching network as claimed in claim 6, in which the marking currents flow in the same direction through the different stages and in the outer stages of said switching stages, the terminals of the crosspoints of such outer stages which correspond only to the holding paths being coupled to those in the adjacent stage through asymmetrically conducting impedances.